United States Patent
Tan et al.

(10) Patent No.: US 12,125,490 B2
(45) Date of Patent: Oct. 22, 2024

(54) SYSTEM AND METHOD FOR DIGITAL ASSISTANT RECEIVING INTENT INPUT FROM A SECONDARY USER

(71) Applicant: MOTOROLA SOLUTIONS, INC., Chicago, IL (US)

(72) Inventors: Woei Chyuan Tan, Bayan Lepas (MY); Bing Qin Lim, Jelutong (MY); Guo Dong Gan, Kula Lumpur (MY); Chun Meng Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 759 days.

(21) Appl. No.: 16/905,327

(22) Filed: Jun. 18, 2020

(65) Prior Publication Data
US 2021/0398543 A1   Dec. 23, 2021

(51) Int. Cl.
*G10L 17/22* (2013.01)
*G06F 16/245* (2019.01)
*G06F 16/248* (2019.01)

(52) U.S. Cl.
CPC ............ *G10L 17/22* (2013.01); *G06F 16/245* (2019.01); *G06F 16/248* (2019.01)

(58) Field of Classification Search
CPC ....... G10L 17/22; G06F 16/245; G06F 16/248
See application file for complete search history.

(56) References Cited

U.S. PATENT DOCUMENTS

| | | | |
|---|---|---|---|
| 7,778,832 B2 | 8/2010 | Broman et al. | |
| 8,234,119 B2 | 7/2012 | Dhawan et al. | |
| 10,210,869 B1 | 2/2019 | King et al. | |
| 10,388,272 B1* | 8/2019 | Thomson | G10L 15/26 |
| 10,438,584 B2 | 10/2019 | Ni et al. | |
| 2014/0164476 A1* | 6/2014 | Thomson | H04L 29/06 709/203 |
| 2017/0147919 A1* | 5/2017 | Lee | G06N 3/00 |
| 2017/0357637 A1* | 12/2017 | Nell | G06F 17/27 |
| 2018/0137267 A1* | 5/2018 | Krieger | G06F 21/32 |
| 2018/0232376 A1 | 8/2018 | Zhu et al. | |
| 2019/0027138 A1 | 1/2019 | Wang et al. | |
| 2019/0206412 A1* | 7/2019 | Li | G10L 15/22 |
| 2019/0251960 A1* | 8/2019 | Maker | G10L 15/22 |
| 2019/0279647 A1* | 9/2019 | Jones | G16H 10/60 |
| 2020/0221155 A1* | 7/2020 | Hansen | H04N 21/41 |

FOREIGN PATENT DOCUMENTS

EP   2946347 B1   8/2019

* cited by examiner

*Primary Examiner* — Richemond Dorvil
*Assistant Examiner* — Ethan Daniel Kim

(57) ABSTRACT

Techniques for a digital assistant to receive intent input from a secondary user are provided. A digital assistant receives a query intent from a primary user, wherein the primary user is authorized to provide query intents. It is determined, based on the query intent, that intent input will be provided by a secondary user, wherein the secondary user is not authorized to provide query intents. Intent input provided by the secondary user is received. The digital assistant processes the query intent using the intent input. The results of the query intent are provided to the primary user.

20 Claims, 4 Drawing Sheets

SYSTEM AND METHOD FOR DIGITAL ASSISTANT RECEIVING INTENT INPUT FROM A SECONDARY USER

BACKGROUND

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners" or "virtual assistants") that may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

A user may awaken the associated digital assistant using a wake word (e.g. "ok, Google" etc.) and then provide a query, which can be referred to as a query intent. For example, a query intent may be "What is the weather today?" The digital assistant may then access one or more databases in order to answer the query intent. In some cases, the query intent may be followed by intent input, which may further define the query intent. For example, "What is the weather today in Chicago?" includes additional intent input specifying that the user is interested in the weather in Chicago, regardless of the current location of the user.

Digital assistants such as the ones previously mentioned are typically used by a small number of users in relative isolation from other members of the public. Although some digital assistants are able to distinguish between multiple speakers in a household (e.g. a husband and wife), they generally will respond to the wake word regardless of who is speaking. Some consumer devices may be interrupted by other users when detecting a wake word. For example, the owner of the device may issue a query intent or subsequent query input, but is interrupted by the speech of other, non-owners. For a consumer device, responsiveness to a user is an important factor. If the digital assistant does not respond when the wake word is spoken, it may cause the user to become frustrated with the digital assistant and no longer use the product.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
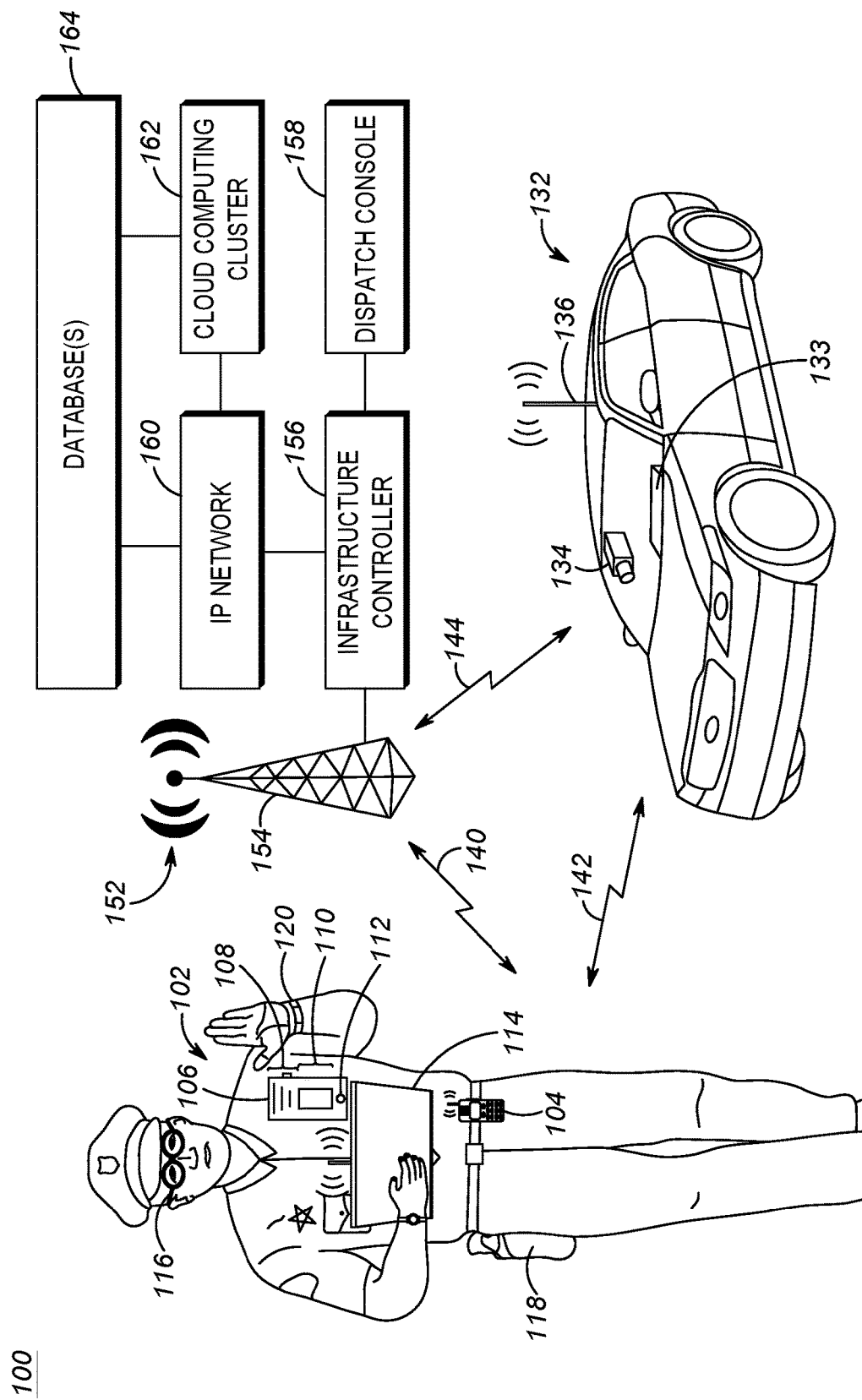
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The use of digital assistants is progressing past the consumer space and into mission critical operations. For example, a digital assistant designed for public safety uses (e.g. police, fire, emergency medical services, etc.) is being developed. For purposes of the remainder of this description, police use of a digital assistant is described. However, it should be understood that techniques described herein are useful for any type of public safety agency or even non-public safety agencies.

For purposes of safety, police officers try to maintain an eyes up, hands free posture at all times. This means the officer is not staring at a computer screen or using a keyboard, thus allowing him to maintain visual situational awareness while at the same time having his hands free to respond to any situation that may occur. Using a digital assistant with an audio user interface aids in allowing the officer to maintain situational awareness. For example, the officer may ask his digital assistant to check the license plate number of a vehicle, issue a "be on the lookout" (BOLO) for a suspect, or any other type of command that would otherwise require interaction with a device, such as a laptop computer within a police vehicle. The voice interface of the digital assistant allows the officer to remain eyes up, hands free.

There are concerns that arise in a public safety context that do not exist in a consumer context. For example, in the consumer space, it is expected that the digital assistant will respond to a wake word, regardless of the person speaking that wake word. Because public safety officers are dealing with the public, their digital assistants would generally be able to receive communications from everyone around the officer. Given the nature of law enforcement, some of those individuals may wish to interfere with the public safety officer by speaking the wake word and issuing commands/queries that would be disruptive. As such, a public safety digital assistant should respond only to the public safety officer to which the digital assistant is assigned.

Limiting responsiveness of a public safety digital assistant to an authorized primary user prevents the situation wherein an unauthorized secondary user issues queries/commands to the digital assistant. For purposes of the remainder of the disclosure a wake word and corresponding query/command will be referred to as a query intent. In other words, a query intent is the combination of waking up the digital assistant (e.g. wake word, button press, etc.) and issuing a question/command to the digital assistant to do a task (e.g. look up a license plate, issue a BOLO, etc.).

Although it is not desirable to have unauthorized secondary users issue query intents, in some cases it might be beneficial to allow unauthorized secondary users to provide additional input to query intents provided by the authorized primary user. For example, a public safety officer may wish to look up a license plate number provided by a citizen (e.g. citizen Smith). Instead of repeating the license plate number, the officer may wish to tell his digital assistant to look up the license plate number that has been/will be provided by citizen Smith. Further input to a query intent will be referred to as intent input. In this case, the intent input is the license number provided by citizen Smith, whereas the query intent (e.g. look up a license plate number) is provided by the authorized public safety officer.

To achieve this goal, the digital assistant may monitor conversations occurring near the public safety officer and build voiceprints of unauthorized secondary users. If a query intent is received from an unauthorized secondary user, the query intent can simply be ignored, because the secondary user's voiceprint is not authorized to issue query intents to the digital assistant. The voiceprints may be associated with identifiers. If a public safety officer wishes to allow intent input from a secondary user, the officer may issue a query intent and specify that intent input will be provided by the secondary user associated with the identifier. The digital assistant will then only accept intent input from the voiceprint associated with the identified secondary user that is associated with the identifier.

A method of querying a digital assistant is provided. A digital assistant receives a query intent from a primary user, wherein the primary user is authorized to provide query intents. It is determined, based on the query intent, that intent input will be provided by a secondary user, wherein the secondary user is not authorized to provide query intents. Intent input provided by the secondary user is received. The digital assistant processes the query intent using the intent input. The results of the query intent are provided to the primary user.

In one aspect, the method further comprises rejecting the intent input provided by the secondary user when the intent input is a query intent. In one aspect, receiving intent input provided by the secondary user further comprises: storing, by the digital assistant, input provided by the secondary user, creating an identifier for the secondary user, creating a voiceprint for the secondary user, associating the stored input with the identifier, determining that the query intent indicates intent input has already been provided and can be accessed based on the identifier, and retrieving the stored input.

In one aspect, the method further comprises creating an identifier for the secondary user, creating a voiceprint for the secondary user, determining from the query intent that intent input will be provided by the secondary user associated with the user identifier, receiving input from the secondary user, comparing the received input to the voiceprint for the secondary user, and using the input as the intent input when the comparison determines that received input matches the voiceprint for the secondary user.

In one aspect, receiving intent input provided by the secondary user further comprises: determining, based on the query intent, that the intent input will be provided by a secondary user, the secondary user having a previously stored voiceprint, receiving input from the secondary user, comparing the received input to the voiceprint for the secondary user, and using the input as the intent input when the comparison determines that received input matches the voiceprint for the secondary user. In one aspect, the method further comprises rejecting the intent input provided by the secondary user when the query intent does not indicate intent input will be provided by a secondary user.

In one aspect, the query intent from the primary user or the intent input from the secondary user is received via a radio talkgroup communication. In one aspect, the method further comprises waiting until the secondary user has completed speaking before processing the intent input. In one aspect the method further comprises: receiving, from the primary user, an instruction to remove the voiceprint associated with the secondary user, and removing the voiceprint associated with the secondary user.

A device is provided. The device includes a processor and a memory coupled to the processor. The memory contains there on a set of instructions that when executed by the processor cause the processor to receive, at a digital assistant, a query intent from a primary user, wherein the primary user is authorized to provide query intents. The instructions further cause the processor to determine, based on the query intent, that intent input will be provided by a secondary user, wherein the secondary user is not authorized to provide query intents. The instructions further cause the processor to receive intent input provided by the secondary user. The instructions further cause the processor to process, by the digital assistant, the query intent using the intent input. The instructions further cause the processor to provide the results of the query intent to the primary user.

In one aspect, the memory further includes instructions that cause the processor to reject the intent input provided by the secondary user when the intent input is a query intent. In one aspect, the instructions to receive intent input provided by the secondary user further comprises instructions to: store, by the digital assistant, input provided by the secondary user, create an identifier for the secondary user, create a voiceprint for the secondary user, associate the stored input with the identifier, determine that the query intent indicates intent input has already been provided and can be accessed based on the identifier, and retrieve the stored input.

In one aspect, the memory further includes instructions that cause the processor to: create an identifier for the secondary user, create a voiceprint for the secondary user, determine from the query intent that intent input will be provided by the secondary user associated with the user identifier, receive input from the secondary user, compare the received input to the voiceprint for the secondary user, and use the input as the intent input when the comparison determines that received input matches the voiceprint for the secondary user.

In one aspect, the instructions to receive intent input provided by the secondary user further comprises instructions to: determine, based on the query intent, that the intent input will be provided by a secondary user, the secondary user having a previously stored voiceprint, receive input from the secondary user, compare the received input to the voiceprint for the secondary user, and use the input as the intent input when the comparison determines that received input matches the voiceprint for the secondary user. In one aspect the memory further includes instructions that cause the processor to: receive, from the primary user, an instruction to remove the voiceprint associated with the secondary user, and remove the voiceprint associated with the secondary user.

A non-transitory processor readable medium containing a set of instructions thereon is provided. The instructions, when executed by a processor cause the processor to receive, at a digital assistant, a query intent from a primary user, wherein the primary user is authorized to provide query intents. The instructions on the medium further cause the processor to determine, based on the query intent, that intent input will be provided by a secondary user, wherein the secondary user is not authorized to provide query intents. The instructions on the medium further cause the processor to receive intent input provided by the secondary user. The instructions on the medium further cause the processor to process, by the digital assistant, the query intent using the intent input. The instructions on the medium further cause the processor to provide the results of the query intent to the primary user.

In one aspect, the instructions on the medium to receive intent input provided by the secondary user further comprises instructions to: store, by the digital assistant, input provided by the secondary user, create an identifier for the secondary user, create a voiceprint for the secondary user, associate the stored input with the identifier, determine that the query intent indicates intent input has already been provided and can be accessed based on the identifier, and retrieve the stored input.

In one aspect, the instructions on the medium further includes instructions that cause the processor to: create an identifier for the secondary user, create a voiceprint for the secondary user, determine from the query intent that intent input will be provided by the secondary user associated with the user identifier, receive input from the secondary user, compare the received input to the voiceprint for the secondary user, and use the input as the intent input when the comparison determines that received input matches the voiceprint for the secondary user.

In one aspect the instructions on the medium to receive intent input provided by the secondary user further comprises instructions to: determine, based on the query intent, that the intent input will be provided by a secondary user, the secondary user having a previously stored voiceprint, receive input from the secondary user, compare the received input to the voiceprint for the secondary user, and use the input as the intent input when the comparison determines that received input matches the voiceprint for the secondary user. In one aspect the instructions on the medium further includes instructions that cause the processor to: receive, from the primary user, an instruction to remove the voiceprint associated with the secondary user, and remove the voiceprint associated with the secondary user.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

1. Communication System and Device Structures a. Communication System Structure

Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices (wherein the single user 102 and the additional users may form a talkgroup of related users).

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, single coupled vehicular transceiver 136, and single speaker, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (i.e., short-range in comparison to the long-range transmitter such as a LMR or broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (i.e., talkgroup members not shown in FIG. 1) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, remote microphone functionality for voice communications in cooperation with portable radio 104, and remote speaker.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

An in-ear or over-the ear earpiece or headphone 115 may be present for providing audio to the user in a private fashion that is not accessible to other users nearby the user 102. The earpiece or headphone 115 may be wiredly or wirelessly communicatively coupled to one or both of the RSM 106 and the portable radio 104, which may be configured to provide audio received from the RAN 152 and/or from other users to the user 102 based on a manual configuration of the RSM 106 or the portable radio 104, or based on some automatic routing mechanism at the one of the RSM 106 and the portable radio 104 that may route all audio to the earpiece or headphone whenever it is detected as connected to the one of the RSM 106 and the portable radio 104, or may selectively route audio received at the one of the RSM 106 and the portable radio 104 to the earpiece or headphone based on various contextual parameters, such as a content of the received audio, an identity of who sent the received audio, a covert status of the user 102, an incident status of the user 102, a determination of nearby users associated with the user 102, or some other contextual parameter.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In other embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In still other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging devices to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other electronic device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. The omni-directional or unidirectional microphone, or an array thereof, may be integrated in the video camera 134 and/or at the vehicular computing device 133 (or additionally or alternatively made available at a separate location of the vehicle 132) and communicably coupled to the vehicular computing device 133 and/or vehicular transceiver 136 for capturing audio and storing, processing, and/or transmitting the audio in a same or similar manner as set forth above with respect to the RSM 106.

Although FIG. 1 illustrates the vehicular video camera 134 and microphone as being placed inside the vehicle 132, in other embodiments, one or both of the vehicular video camera 134 and microphone may be placed at visible or hidden locations outside of the vehicle 132, such as within a vehicular grill portion or bumper portion, or on a roof portion, of the vehicle 132. Further, although FIG. 1 illustrates the single speaker as being placed inside of the vehicle 132 and coupled to the vehicular computing device 133, in other embodiments, multiple speakers may be provided inside and/or outside of the vehicle 132 (all addressed simultaneously or individually addressable for outputting separate audio streams), or the single speaker 137 may be placed outside of the vehicle and function as a PA speaker, among other possibilities.

The vehicle 132 may be a human-operable vehicle, or may be a self-driving vehicle operable under control of mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras and sensors) within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency division multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster such as cloud compute cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (e.g., a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud compute cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud compute cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

Database(s) 164 may be accessible via IP network 160 and/or cloud compute cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at infrastructure controller 156. In some embodiments, the databases 164 may be maintained by third parties (for example, the National Weather Service or a Department of Transportation, respectively). As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1 are merely examples. In some embodiments, the system 100 additionally or alternatively includes other databases that store different information. In some embodiments, the databases 164 disclosed herein and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police car or cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (e.g., a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (e.g., a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (e.g., a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (e.g., a medical gurney or an ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, front loader). As one other example, the communication system 100 may additionally or alternatively be a transportation logistics communication system including a user 102 that may be a bus driver or semi-truck driver at a school or transportation company and a vehicle 132 that may be a vehicle for use by the user 102 in furtherance of the driver's duties. In the examples of a user 102 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

b. Device Structure

Figure 2:
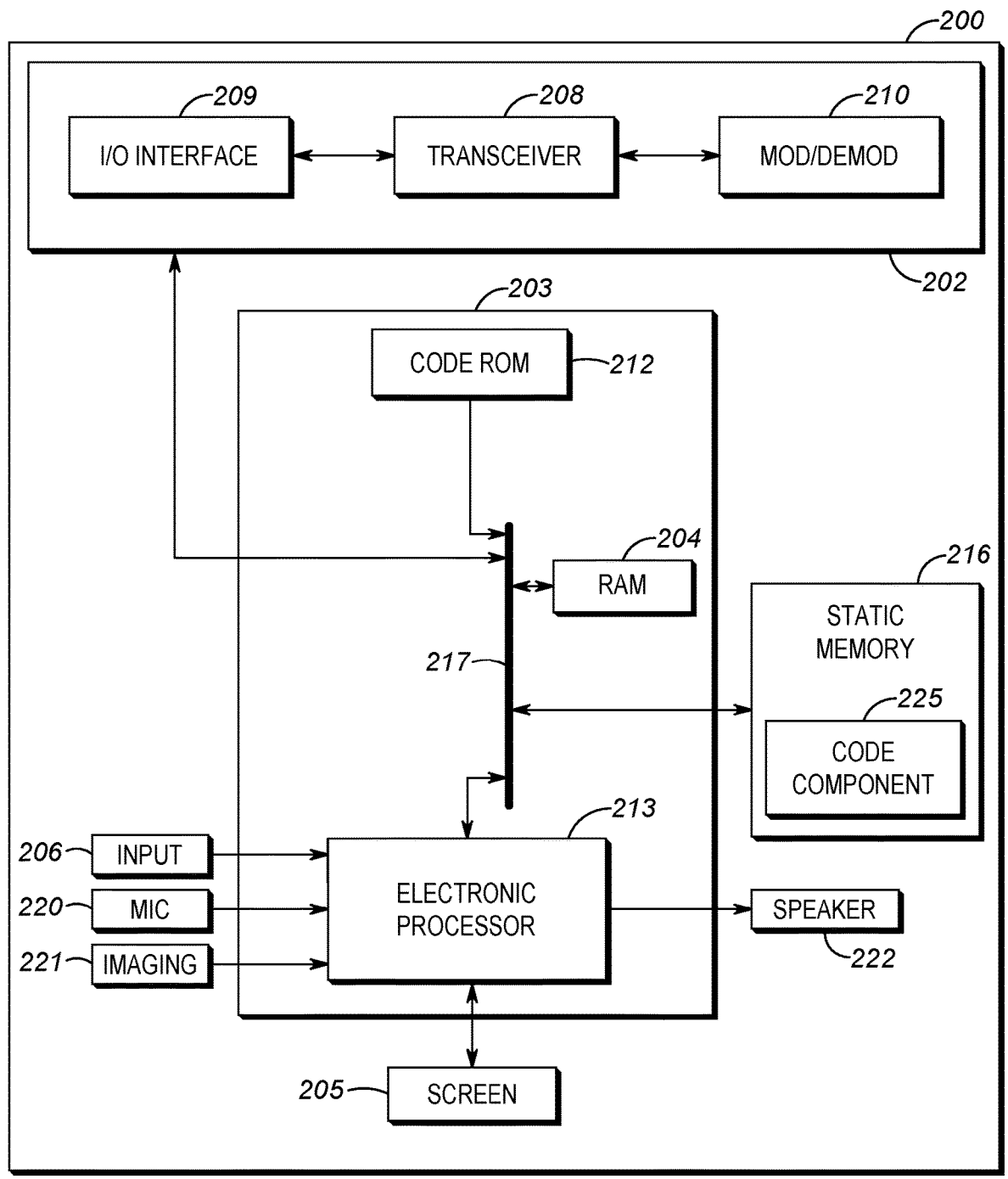
FIG. 2 is a device diagram showing a device structure of an electronic computing device for operating an electronic digital assistant, in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud compute cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIG. 1, depending on the type of the communication device, the communication device 200 may include fewer or additional components in configurations different from that illustrated in FIG. 2. For example, in some embodiments, communication device 200 acting as the infrastructure controller 156 may not include one or more of the screen 205, input device 206, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, communication device 200 includes a communications unit 202 coupled to a common data and address bus 217 of a processing unit 203. The communication device 200 may also include one or more input devices (e.g., keypad, pointing device, touch-sensitive surface, etc.) 206 and an electronic display screen 205 (which, in some embodiments, may be a touch screen and thus also act as an input device 206), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the input device 206, the microphone 220, the imaging device 221, and/or the speaker 222. Static memory 216 may store operating code 225 for the electronic processor 213 that, when executed, performs one or more of the steps set forth in FIGS. 3 and 4 and the accompanying text.

In some embodiments, static memory 216 may also store, permanently or temporarily, a threshold level mapping indicating numerical ranges at which auditory output generated by the electronic digital assistant may be lengthened and/or shortened, a database of acronyms and their associated full terms for use in transitioning between one or the other based on a detected acoustic environment, a thesaurus database of words having similar meanings and including a syllable count for use in transitioning between them based on a detected acoustic environment, a 10-code database including the 10-code and the 10-codes associated full term meaning for use in transitioning between one or the other based on a detected acoustic environment, a contraction database setting forth contractions and the words they stand for use in transitioning between one or the other based on a detected acoustic environment, and an abbreviation database including the abbreviation and the full word that the abbreviation abbreviates for use in transitioning between one or the other based on a detected acoustic environment.

The static memory 216 may comprise, for example, a hard-disk drive (HDD), an optical disk drive such as a compact disk (CD) drive or digital versatile disk (DVD) drive, a solid state drive (SSD), a flash memory drive, or a tape drive, and the like.

2. Processes for Digital Assistant Receiving Intent Input from a Secondary User In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end cloud compute cluster 162 accessible via the IP network 160.

To use the electronic digital assistant implemented by the electronic computing device, the user 102 may, for example, provide an oral query or statement that is received by the microphone 220 of the communication device 200. The electronic computing device receives signals representative of the oral query or statement from the microphone 220 and analyzes the signals to determine the content of the oral query or statement. For example, the electronic computing device may include a natural language processing (NLP) engine configured to determine the intent and/or content of the oral query or statement. The electronic computing device may also be configured to determine a response to the oral query (for example, by retrieving stored data or by requesting data from a database such as one of the databases 164) and provide the response to an output device of the communication device 200 (for example, one or more of the speaker 222 via a generated audio response and the screen 205 via a generated text based response), or some other action to take in light of the content of the oral query and/or statement. In other words, one or more of the communication device 200, embodied in one or more of the communication devices of FIG. 1, such as the portable radio 104, the infrastructure controller 156, and/or the cloud compute cluster 162, may include an NLP engine to analyze oral queries and/or statements received by the microphone 220 of the communication device 200 and provide responses to the oral queries and/or take other actions in response to the oral statements. As will be described in further detail below, input may also be received from one or more additional, secondary users that are not normally authorized to issue query intents.

Although an oral query and/or statement is described above, in some embodiments, the electronic computing device receives and responds to other types of queries and inputs. For example, the user 102 may submit a text query or statement to the electronic computing device by typing the text query or statement into a hard keyboard input device 206 or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video and provide a response and/or take other actions.

Figure 3:
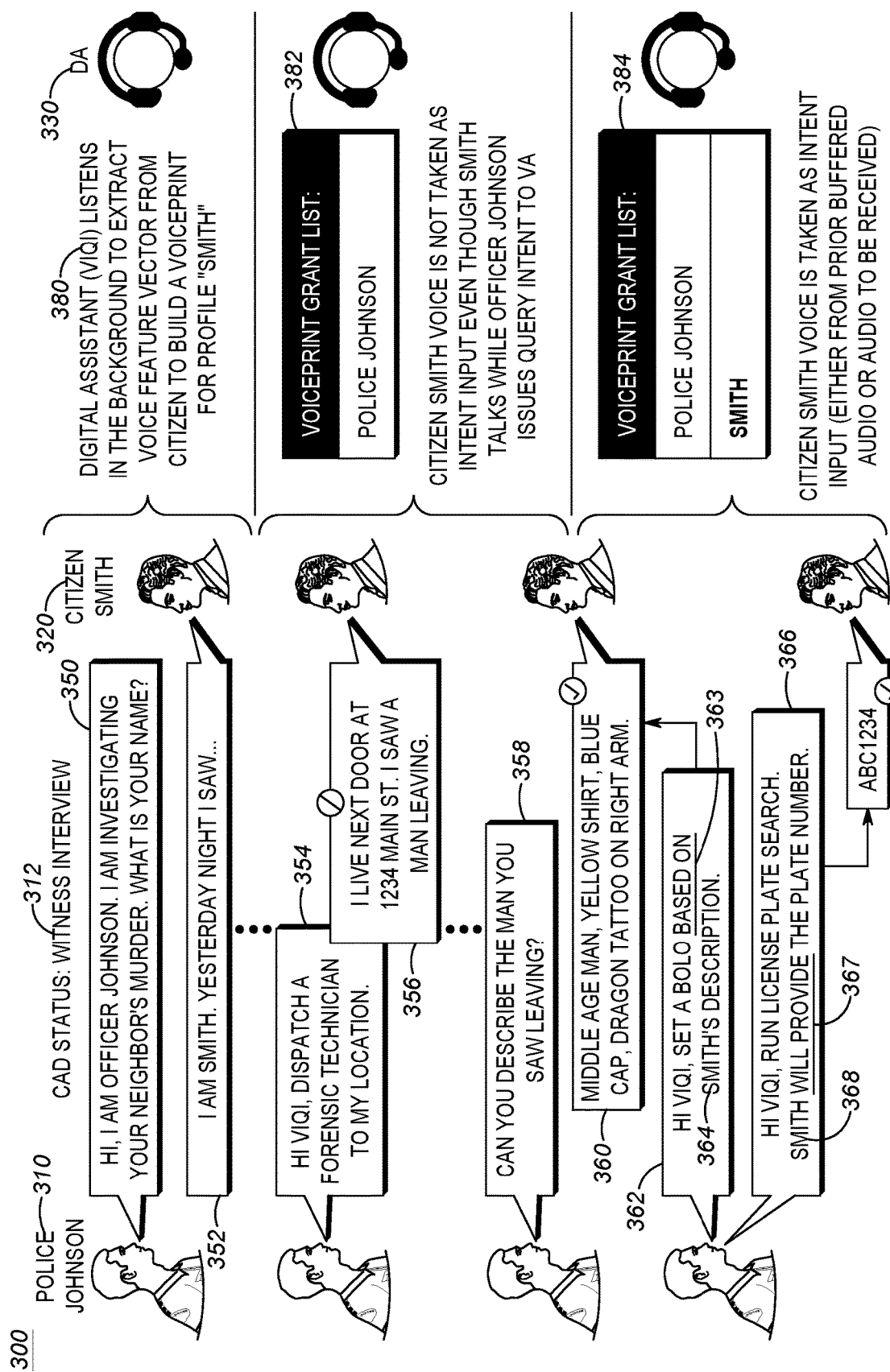
FIG. 3 is an example of an interaction between a primary user, a secondary user, and a digital assistant in accordance with the receiving intent input from a secondary user techniques described herein.

FIG. 3 is an example of an interaction between a primary user, a secondary user, and a digital assistant in accordance with the receiving intent input from a secondary user techniques described herein. As shown in the example system 300 of FIG. 3, there are three entities involved: Police officer Johnson 310, Citizen Smith 320, and Digital Assistant (DA) 330.

Police officer Johnson 310 may be engaged in law enforcement activities. As will be described in further detail below, Officer Johnson 310 may currently be engaged in interviewing a witness to a crime. As such, Officer Johnson may have a status in the computer aided dispatch (CAD) system of witness interview 312, indicating the officer is currently engaging with citizens who may have witnessed a crime. For example, Citizen Smith 320 may be a citizen who has information about the crime that officer Johnson is investigating.

Police officer Johnson 310 may be equipped with a communications device, such as a land mobile radio walkie talkie as described with respect to FIG. 2. Digital assistant 330 may be an assistant that is designed for use in public safety applications. For purposes of the remainder of the description, the public safety digital assistant may be referred to as ViQi. For example, ViQi may be the wake word assigned to the public safety digital assistant. It should be understood that this is for ease of description and not by way of limitation. In some implementations, rather than use a wake word, the digital assistant may be equipped with a physical button that may be pressed in order to wake the digital assistant and prepare it for receiving a query intent.

As shown, police officer Johnson 310 may introduce himself 351 to citizen Smith 320 by stating his name and the purpose of the witness interview. In the present example, police officer Johnson 310 may state his name and notify citizen Smith that he is investigating the murder of Smith's neighbor. In one example, this introduction and notification of the purpose of the witness interview may be automatically detected by the device and the status of police officer Johnson as being engaged in a witness interview may be updated in the CAD system. In turn, Citizen Smith 320 may introduce himself (e.g. "I am Smith. Yesterday I saw . . . "). The Digital assistant 330 may monitor this conversation between officer Johnson 310 and Citizen Smith 320 in the background in order to extract a voice feature vector from citizen Smith to build a voiceprint for citizen Smith. In one example, digital assistant 330 may start to monitor and build the voiceprint of the secondary user when the CAD system determines that there is need to do so when the status of office Johnson is witness interview. In other examples, digital assistant 330 can constantly monitor and build the voiceprint of a secondary user whenever any previously unknown voiceprint is detected. As will be explained in further detail below, the voiceprint may be used to determine when input from citizen Smith is accepted by the digital assistant.

Officer Johnson may request the digital assistant to dispatch a forensic technician to his location via query intent 354 (e.g. "Hi ViQi, dispatch a forensic technician to my location."). The digital assistant 330 recognizes the voiceprint of officer Johnson 310 as an authorized, primary user of the digital assistant. As such, the voiceprint of officer Johnson 310 is included in a voiceprint grant list as an authorized primary user. As mentioned briefly above, a voiceprint is unique to each user and may be used to identify the user (similarly to how a fingerprint may be used to identify a person).

A voiceprint may be obtained when the digital assistant and the primary user are originally associated with each other. For example, as part of the process of registering with the digital assistant as a primary user, officer Johnson may have provided his voiceprint. The specific techniques used to identify a voiceprint are relatively unimportant. The techniques described herein are usable with any technology currently available or later developed that may be used to associate a voiceprint with a specific user.

In the present example, citizen Smith 320 provides information 356 ("I live next door at 1234 Main St. I saw a man leaving") while officer Johnson is in the midst of issuing the query intent 354 to dispatch a forensic technician. However, because the query intent issued by officer Johnson 310 did not include an indication that intent input would be provided by a secondary, unauthorized user, the digital assistant 330 ignores the address that is provided by citizen Smith. Absent the techniques described herein, the digital assistant may have unintentionally used the address provided 356 by citizen Smith as intent input to the query intent 354, and cause the forensic technician to be dispatched to the neighbors address as opposed to the current location.

It should be noted that in the example described, it is assumed citizen Smith 320 is cooperative. In many law enforcement situations, suspects, witnesses, etc. may not necessarily be receptive to police presence. In some cases, citizens may attempt to deliberately confuse the digital assistant by yelling irrelevant/incorrect information. In accordance with the techniques described herein, unless the primary user specifically authorizes intent input to come from secondary users, any intent input provided by those not on the voiceprint grant list 382 is explicitly ignored.

Continuing with the example, officer Johnson 358 may ask Citizen Smith 320 for information (e.g. "Can you describe the man you saw leaving?"). Citizen Smith 320 may respond with a description 360 (e.g. "Middle age man, yellow shirt, blue cap, dragon tattoo on right arm."). The digital assistant 330 may develop a voiceprint based on the description 360. The voiceprint may be included in the voiceprint grant list 384 as a secondary user. In this example, because citizen Smith provided an identifier (e.g. his name) in 352, the voice print grant list 384 may identify the voiceprint with the name Smith, and associate that voice print with a secondary user.

Officer Johnson may issue a query intent to set a BOLO 362 ("Hi ViQi, set a BOLO based on Smith's description"). The query intent 362 includes a key word "based on" 363 which indicates to the digital assistant that intent input (e.g. the description) has previously been provided by someone in the voiceprint list named Smith 364. Digital assistant 330 will then add Smith to the voiceprint grant list. Because Smith exists in the voiceprint grant list, the description previously provided by Smith can be retrieved and is used as intent input to the query intent provided by officer Johnson 310.

In some cases, the intent input has not yet been received by the digital assistant at the time the query intent is issued. For example, officer Johnson 310 may issue a query intent to run a license plate search on a license plate number to be provided by Smith 366 (e.g. "Hi ViQi, run license plate search. Smith will provide the plate number."). The key word "will provide" is detected by the digital assistant 330 and the digital assistant is able to determine that intent input is to be provided by a person whose voiceprint is included or will be included in the voiceprint grant list, and the voiceprint is identified by the name Smith 368.

It should be noted that even if there are other people in the area shouting false license plate numbers, the digital assistant will only accept intent input that matches the voiceprint from citizen Smith. Thus, if criminal Jones (not shown) begins yelling fake license plate numbers to attempt to hinder the investigation, such intent input will be ignored as it does not match the voice print of Smith. Furthermore, it should be understood that even though citizen Smith 320 is included in the voiceprint grant list, it is only as a secondary user. Secondary user's are prevented from issuing query intents. For example, if Smith were to attempt to issue a BOLO, the digital assistant would reject the query intent, because secondary users are not allowed to issue query intents. Furthermore, secondary users are only allowed to provide intent input when the initial query intent from the primary user indicates that intent input will be provided by a secondary user.

In some cases, the expected intent input by the secondary user is not received or is incomplete or is irrelevant to the primary user query intent. For example, officer Johnson 310 may issue a query intent to run a license plate search on a license plate number to be provided by Smith 320 (e.g. "Hi ViQi, run license plate search. Smith will provide the plate number."). Smith may not provide intent input initially that is at all relevant to the query intent (e.g. Smith 320: "I was so shocked when the car ran toward and almost hit me. I saw a black car with the license plate ABC123"), the digital assistant will prolong the wait time as long as it detected the secondary voice is still speaking. In another situation, the primary user might intervene so that the secondary user would reply with the relevant answer (e.g. officer Johnson 310: "Smith, I am asking you for the license plate, please do not reply with other non-relevant info". Smith 320: "Okay, the license plate is ABC123"). The digital assistant will prolong the wait time as long as it detects the authorized primary user's voice is clarifying the previous query intent.

In some cases, the expected intent input by a secondary user is not trusted. For example, the secondary user may purposely provide false intent input to slow down the police investigation. For example, officer Johnson 310 may issue a query intent to run a license plate search on a license plate number to be provided by Smith 320 (e.g. "Hi ViQi, run license plate search. Smith will provide the plate number."). Smith did not provide an answer relevant to the license plate instantly (e.g. Smith 320: "I was so shocked when the car ran toward and almost hit me . . . "). The digital assistant may bar or remove the secondary user from the trusted intent input list based on the primary user's instruction. For example, officer Johnson 310 may issue a query intent to bar Smith 320 from the digital assistant trusted list of intent input. (e.g. Johnson 310: "VIQI, please remove Smith from the voiceprint grant list"). In another example, the digital assistant may ignore the secondary user intent input if the intent input is not relevant to the query intent, stop the query processing and subsequently notify the primary user that the query has been terminated (e.g. through voice output or audio tone).

Figure 4:
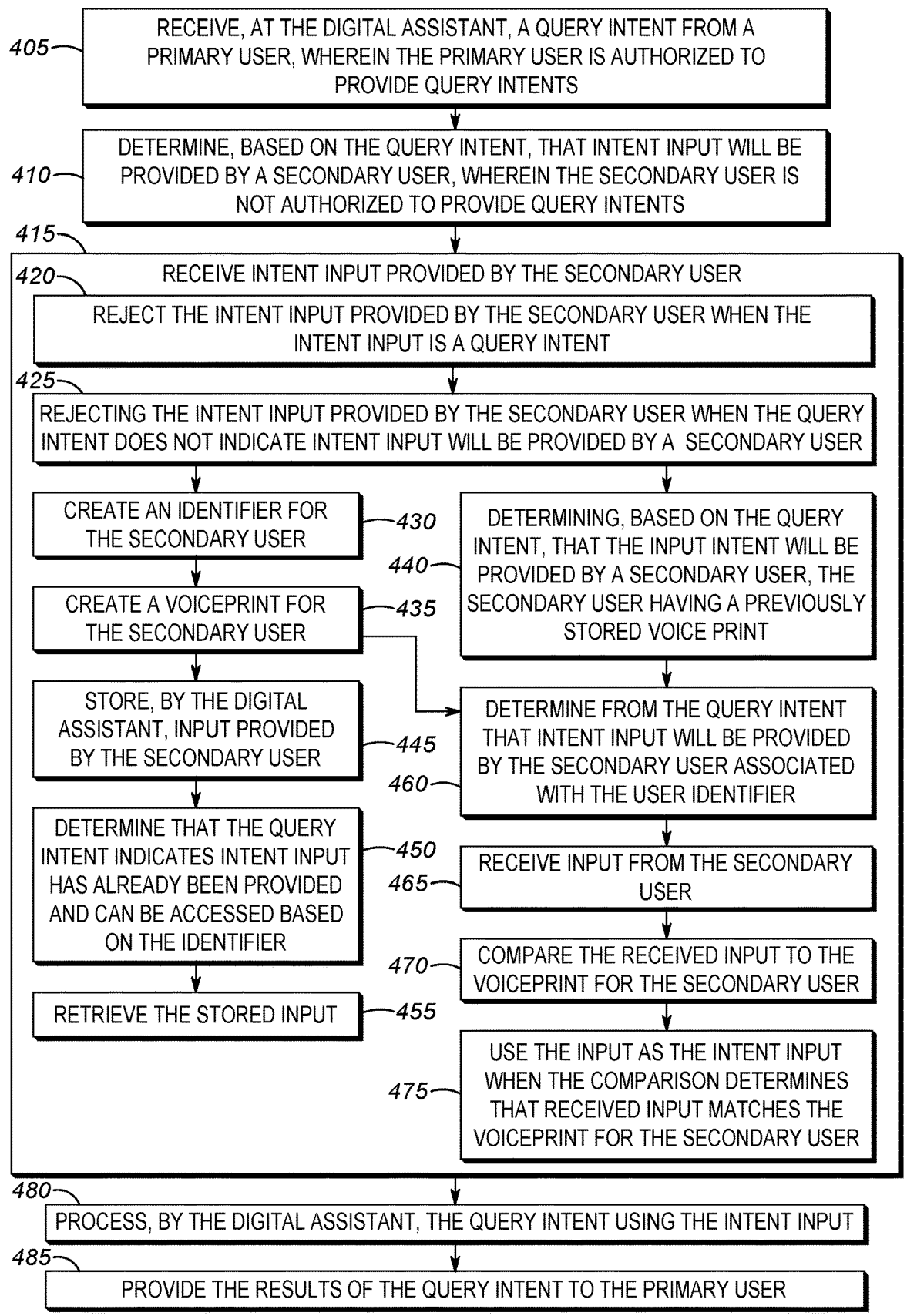
FIG. 4 is an example of a flow diagram for receiving intent input from a secondary user, in accordance with the techniques described herein.

FIG. 4 is an example of a flow diagram for receiving intent input from a secondary user, in accordance with the techniques described herein. In block 405, a query intent from a primary user may be received at the digital assistant. The primary user is authorized to provide query intents. In the case of the digital assistant for public safety, the primary user will typically be a member of law enforcement, or some other public safety agency, who has a digital assistant assigned to them. The digital assistant will know the voiceprint of the primary user and thus is able to limit query intents to only those users that are authorized to provide query intents. In one example, when a primary user logs in to a device, the voiceprint of the primary user would be retrieved from the database based on the login identifier. In one example, the primary user may have provided voice input to the device when first associated with the device (e.g. new device assigned to user) to create a voiceprint, either using text-dependent speech recognition method or text-independent speech recognition method.

In block 410, based on the query intent, it may be determined that the intent input will be provided by a secondary user. The secondary user is not authorized to provide query intents. In the example described in FIG. 3, citizen Smith is a secondary user and is not authorized to provide query intents. Instead, the secondary user is only allowed to provide intent input, and even then only when it is determined that the query intent from the primary user is requesting that intent input be provided by a secondary user.

In block 415, intent input from the secondary user may be received. The intent input can be received in multiple different ways, which will be described in further detail below. However, prior to processing the intent input, certain checks are made on the input provided by the secondary user. In block 420, the intent input provided by the secondary user may be rejected if it is determined that the intent input is a query intent. As explained above, secondary users are not allowed to issue query intents, but rather are only allowed to provide intent input to query intents issued by primary users. If a secondary user attempts to issue a query intent, the request will be rejected.

In block 425, the intent input provided by the secondary user may be rejected when the query intent does not indicate that intent input will be or has been provided by a secondary user. As explained above, the intent input received from a secondary user is only processed when the query intent indicates that intent input will be or has been provided by a secondary user. This prevents the case, such as described in FIG. 3, with respect to element 354-356 where the secondary user tries to provide intent input when the primary user has not requested it. This will also prevent the secondary user from attempting to override the primary users query intent by providing input that is unwanted.

In block 430, an identifier may be created for the secondary user. For example, the identifier may be the secondary user's name. The identifier may be determined by the digital assistant monitoring the conversation that is ongoing between the primary user (e.g. public safety official, etc.) and the secondary user (e.g. citizen). Even if a name cannot be determined, some type of indication that identifies the speaker may be created (e.g. witness number 1). In block 435, a voiceprint for the secondary user may be created. The voiceprint, just like a fingerprint, may be utilized to identify a speaker. An example method of extracting a voiceprint from a secondary user may include, but is not limited to, any text-independent speaker recognition method that extracts voice feature vectors that represent resonance properties of the supralaryngeal vocal tract, phonemic spectra, characteristic of glottal flow and vocal folds. Other examples of text-independent speaker recognition methods can include, but are not limited to, speech parameterization using filter-bank-based cepstral parameterization, and speech feature statistical modeling using Gaussian mixture model (GMM). The ability to obtain intent input from the secondary user is based on the voiceprint of the secondary user matching the voiceprint of the intent input (e.g. the speaker is the authorized secondary user).

In an alternate embodiment, in block 440, it may be determined based on the query intent that the intent input will be provided by a secondary user having a previously stored voiceprint. For example, a secondary user may have had previous interactions with the primary user, and the voiceprint of that secondary user is already stored in the digital assistant with a known identifier, thus obviating the need to create an identifier and store a voiceprint along with that identifier. In another example the secondary user is a teammate of officer Johnson thus the voiceprint of the teammate and its associated identifier would be readily available in the public safety database that the digital assistant has access to. In yet another example, either the primary user, the secondary user or both of them are in a communication talkgroup, thus the voice input of the secondary user might be from the talkgroup audio. In this example, the primary user (e.g. a commander at command center) may be making a query intent to a digital assistant (received through device microphone or through talkgroup communication) to get intent input from a voice of a secondary user (e.g. a police officer in the field) that would be received by the device (e.g. a radio) or talkgroup server through talkgroup communication. The digital assistant in this example can be receiving the query intent from primary user or query input from secondary user from the device microphone input or receiving them at the remote talkgroup server. In one example, the digital assistant identifies the secondary user through audio or video processing (through body worn camera) and directs the audio beamforming of the directional microphone of the device towards the secondary user so that to better receive intent input from the secondary user.

In block 445, the digital assistant may store input provided by the secondary user. As explained above with respect to element 360, sometime intent input will be provided prior to a query intent and stored for later use. Thus, the digital assistant may store input provided by the secondary user for possible later use. In some implementations, either block 430, block 435, block 445 or in combination of them can happen before block 405 to detect the existence of another voice with different voiceprint compared to primary voiceprint, create a secondary voiceprint, assign an identifier to the secondary voiceprint, and store the voice input from secondary user so that to be retrieved for later used for intent input based on query intent of the primary user. In block 450, it may be determined that the query intent indicates intent input has already been provided and can be accessed based on the identifier. In other words, the primary user can specify to the digital assistant that the needed intent input has already been received and stored and can now be retrieved from storage. In block 455, the stored input may be retrieved.

In an alternate flow, in block 460, it may be determined from the query intent that intent input will be provided by the secondary user associated with the identifier. In other words, the secondary user has not yet provided the intent input. In block 465, input may be received from the secondary user.

In block 470, the received input may be compared to the voiceprint for the secondary user. This step may be used to verify that the input is being provided by the desired secondary user as opposed to a random third party. In block 475, the input may be used as the intent input when the comparison determines that received input matches the voiceprint for the secondary user. In other words, the received input was produced by the expected secondary user, and as such can be processed as the intent input.

In block 480, the digital assistant may process the query intent using the intent input. The specific nature of the query intent is unimportant. What should be understood is that the primary user issues a query intent, and that query intent takes as input the intent input provided by the secondary user. The intent input provided by the secondary user is verified by determining that the voiceprint of the intent input matches the expected voiceprint of the secondary user. In block 485, the results of the query intent may be provided to the primary user. Again, the specific nature of the query intent is unimportant. What should be understood is that the digital assistant processes the query intent by utilizing the intent input, and then provides the results, whatever they happen to be, to the primary user.

3. Conclusion

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of querying a digital assistant comprising:
   receiving, at the digital assistant, a query intent from a primary user, wherein the primary user is authorized to provide query intents;
   determining, based on the query intent, that intent input will be provided by a secondary user, wherein the secondary user is not authorized to provide query intents;
   receiving intent input provided by the secondary user;
   processing, by the digital assistant, the query intent using the intent input; and
   providing the results of the query intent to the primary user.

2. The method of claim 1 further comprising:
   rejecting the intent input provided by the secondary user when the intent input is a query intent.

3. The method of claim 1 wherein receiving intent input provided by the secondary user further comprises:
   storing, by the digital assistant, input provided by the secondary user;
   creating an identifier for the secondary user;
   creating a voiceprint for the secondary user;
   associating the stored input with the identifier;
   determining that the query intent indicates intent input has already been provided and can be accessed based on the identifier; and
   retrieving the stored input.

4. The method of claim 1 further comprising:
   creating an identifier for the secondary user;
   creating a voiceprint for the secondary user;
   determining from the query intent that intent input will be provided by the secondary user associated with the user identifier;
   receiving input from the secondary user;
   comparing the received input to the voiceprint for the secondary user; and
   using the input as the intent input when the comparison determines that received input matches the voiceprint for the secondary user.

5. The method of claim 1 wherein receiving intent input provided by the secondary user further comprises:
   determining, based on the query intent, that the intent input will be provided by a secondary user, the secondary user having a previously stored voiceprint;
   receiving input from the secondary user;
   comparing the received input to the voiceprint for the secondary user; and
   using the input as the intent input when the comparison determines that received input matches the voiceprint for the secondary user.

6. The method of claim 1 further comprising:
   rejecting the intent input provided by the secondary user when the query intent does not indicate intent input will be provided by a secondary user.

7. The method of claim 1 wherein the query intent from the primary user or the intent input from the secondary user is received via a radio talkgroup communication.

8. The method of claim 1 further comprising:
   waiting until the secondary user has completed speaking before processing the intent input.

9. The method of claim 3 further comprising:
   receiving, from the primary user, an instruction to remove the voiceprint associated with the secondary user; and
   removing the voiceprint associated with the secondary user.

10. A device comprising:
    a processor; and
    a memory coupled to the processor, the memory containing a set of instructions thereon that when executed by the processor cause the processor to:
       receive, at a digital assistant, a query intent from a primary user, wherein the primary user is authorized to provide query intents;
       determine, based on the query intent, that intent input will be provided by a secondary user, wherein the secondary user is not authorized to provide query intents;
       receive intent input provided by the secondary user;
       process, by the digital assistant, the query intent using the intent input; and
       provide the results of the query intent to the primary user.

11. The device of claim 10 wherein the memory further includes instructions that cause the processor to:
    reject the intent input provided by the secondary user when the intent input is a query intent.

12. The device of claim 10 wherein the instructions to receive intent input provided by the secondary user further comprises instructions to:
    store, by the digital assistant, input provided by the secondary user;
    create an identifier for the secondary user;
    create a voiceprint for the secondary user;
    associate the stored input with the identifier;
    determine that the query intent indicates intent input has already been provided and can be accessed based on the identifier; and
    retrieve the stored input.

13. The device of claim 10 wherein the memory further includes instructions that cause the processor to:
    create an identifier for the secondary user;
    create a voiceprint for the secondary user;
    determine from the query intent that intent input will be provided by the secondary user associated with the user identifier;
    receive input from the secondary user;
    compare the received input to the voiceprint for the secondary user; and
    use the input as the intent input when the comparison determines that received input matches the voiceprint for the secondary user.

14. The device of claim 10 wherein the instructions to receive intent input provided by the secondary user further comprises instructions to:
    determine, based on the query intent, that the intent input will be provided by a secondary user, the secondary user having a previously stored voiceprint;
    receive input from the secondary user;
    compare the received input to the voiceprint for the secondary user; and
    use the input as the intent input when the comparison determines that received input matches the voiceprint for the secondary user.

15. The device of claim 12 wherein the memory further includes instructions that cause the processor to:
    receive, from the primary user, an instruction to remove the voiceprint associated with the secondary user; and
    remove the voiceprint associated with the secondary user.

16. A non-transitory processor readable medium containing a set of instructions thereon that when executed by a processor cause the processor to:
    receive, at a digital assistant, a query intent from a primary user, wherein the primary user is authorized to provide query intents;
    determine, based on the query intent, that intent input will be provided by a secondary user, wherein the secondary user is not authorized to provide query intents;
    receive intent input provided by the secondary user;
    process, by the digital assistant, the query intent using the intent input; and
    provide the results of the query intent to the primary user.

17. The medium of claim 16 wherein the instructions to receive intent input provided by the secondary user further comprises instructions to:
    store, by the digital assistant, input provided by the secondary user;
    create an identifier for the secondary user;
    create a voiceprint for the secondary user;
    associate the stored input with the identifier;
    determine that the query intent indicates intent input has already been provided and can be accessed based on the identifier; and
    retrieve the stored input.

18. The medium of claim 16 wherein the medium further includes instructions that cause the processor to:
    create an identifier for the secondary user;
    create a voiceprint for the secondary user;
    determine from the query intent that intent input will be provided by the secondary user associated with the user identifier;
    receive input from the secondary user;
    compare the received input to the voiceprint for the secondary user; and
    use the input as the intent input when the comparison determines that received input matches the voiceprint for the secondary user.

19. The medium of claim 16 wherein the instructions to receive intent input provided by the secondary user further comprises instructions to:
    determine, based on the query intent, that the intent input will be provided by a secondary user, the secondary user having a previously stored voiceprint;
    receive input from the secondary user;

compare the received input to the voiceprint for the secondary user; and use the input as the intent input when the comparison determines that received input matches the voiceprint for the secondary user.

20. The medium of claim 17 wherein the medium further includes instructions that cause the processor to:

receive, from the primary user, an instruction to remove the voiceprint associated with the secondary user; and remove the voiceprint associated with the secondary user.

* * * * *